March 20, 1928.
W. S. GRAHAM ET AL
TRACTOR CULTIVATOR
Filed June 30, 1926
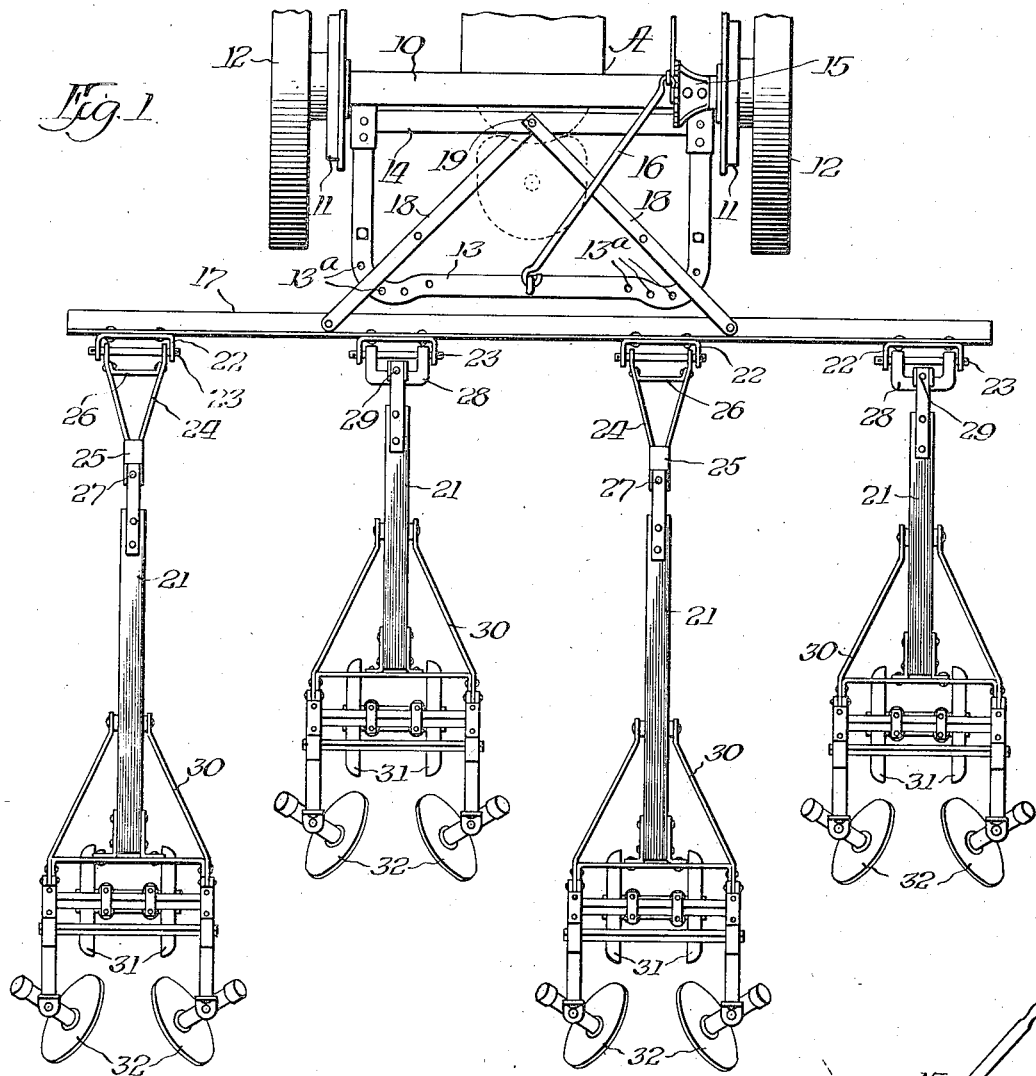
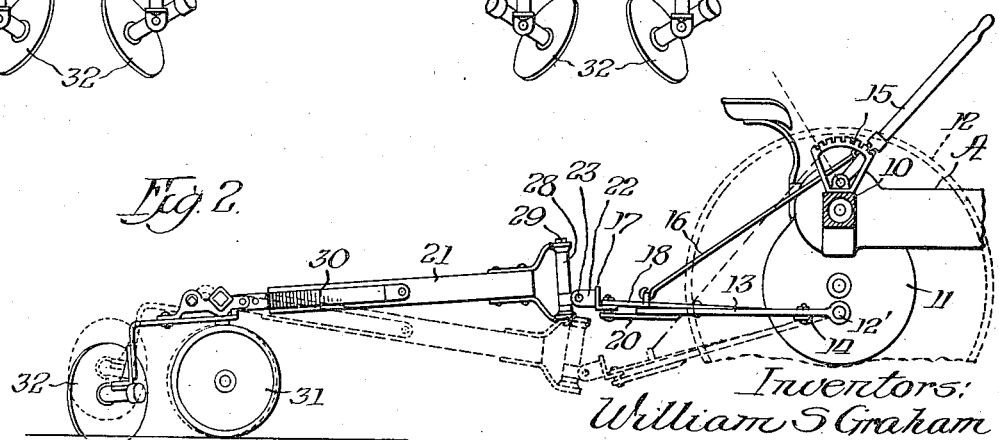
Inventors:
William S. Graham
and Arthur D. Gallagher
By H. P. Doolittle
Atty.
1,663,249

Patented Mar. 20, 1928.

1,663,249

UNITED STATES PATENT OFFICE.

WILLIAM S. GRAHAM AND ARTHUR D. GALLAGHER, OF CANTON, ILLINOIS, ASSIGNORS TO INTERNATIONAL HARVESTER COMPANY, OF CHICAGO, ILLINOIS, A CORPORATION OF NEW JERSEY.

TRACTOR CULTIVATOR.

Application filed June 30, 1926. Serial No. 119,565.

The present invention relates to improvements in agricultural implements of the type used for work on row crops, and, more specifically, to improvements in the manner of connecting, arranging, and controlling a plurality of furrow guided working units in co-relation with certain parts of a draft frame, or tractor.

An object of the invention is to provide means for working a number of plant rows, preferably four or more, at each traverse of the field, and to accomplish this by use of a series of tillage, or equivalent, units arranged in certain spaced relation with respect to each other and to the rear wheels of a draft frame or tractor of special type.

Another object is to provide a means of connection between the tillage units and the draft frame that will equally distribute the draft to all the units, permit necessary play between parts and include means for controlling the work of the units.

Other objects and advantages will become evident from the following specific disclosure of the organization and details of construction through which the main objects set forth have been attained.

In the accompanying drawing,—

Figure 1 is a plan view showing the rear of a tractor with the tillage units attached thereto; and Figure 2 is a similar side view with the range of adjustment of certain parts shown in dotted lines.

In the present instance the invention has been illustrated as embodied in an organization comprising a draft frame A, which is preferably a tractor of the type having a rear arched portion adapted to span two plant rows. This part of the tractor constitutes what is herein termed a traction or draft frame and includes a transverse housing 10 having depending housings 11 fixed to each end thereof, which housings carry spindles on which the traction wheels 12 are journaled. The inner faces of the housings 11 have pintles 12' thereon on which the arms of an arched draw bar 13 are pivoted. The forward portions of the arms of this draw bar are connected by a transverse hitch member, or bar, 14. The arched draw bar 13 is accordingly free to swing on the pintles 12', and suitable means for adjusting it vertically is provided as by a rack and lever 15 mounted on the transverse housing 10 and connected by a link 16 with the transverse portion of the arched draw bar as seen in Figure 1.

For combination with the draw bar 13 and hitch bar 14, above described, there is provided a transverse draft member 17, which is preferably located just behind and substantially in the same plane as the draw bar 13 and is extended to points beyond the wheels 12 of the draft frame or tractor. This draft member is connected to the hitch bar 14 so that it may have a certain range of movement horizontally with relation to the arched draw bar, and this may be accomplished by providing a pair of draft links 18, which are connected at their rear ends to the draft member 17 at widely spaced points and converge forwardly to a central point on the hitch bar 14, to which they are both pivoted by means of a pin, or bolt, 19. The draft links 18 preferably pass over the arched draw bar, and spaced retainers 20 (Fig. 2) are provided on the under side of each link 18 to embrace the draw bar and restrain it against vertical movement with relation to links 18 and draft member 17. Two series of apertures, as at 13ª, are provided in the drawbar 13 adjacent links 18 which can serve to receive stops for limiting movement of the links 18 as may be desired.

With a construction such as described, it will be evident that swinging movement of the arched bar 13 will cause similar movement of the draft member 17, and that these parts can be given vertical adjustment by manipulation of the lever 15. It will also be evident that the draft member 17 will be capable of a certain range of horizontal movement about the pivot 19, to provide flexibility and facilitate turning of the implement, the draft links 18 sliding horizontally on arched bar 13 by which they are supported.

The draft member 17 has connected to it at spaced points corresponding to the normal spacing of plant rows, a number, usually four or more, tillage units, as shown in Figure 1. These units are preferably arranged in offset or staggered relation, as illustrated, in order to provide clearance between them during a turn, and as the association of these units is with a draft frame, the wheels of which span two plant rows, the arrangement of the units with relation to the wheels is preferably such that two rows within the tread of the wheels and rows outside the treads are engaged by the units. The tillage units are substantially identical in construction with the exception of the long and short tongues on the rear and forward units respectively and are here disclosed as of conventional disk lister cultivator type. Each unit comprises a tongue 21, the forward end of which is pivoted to the draft member 17 as by means of a U-shaped plate 22 carrying a draft pin 23 with which the clevis 24 on the front of the tongue is connected. In the case of the longer tongues, this clevis preferably comprises diverging arms extending from a head or block 25 and connected by a cross brace 26, and the tongue is pivoted on a vertical pin 27 of this block. In the case of the shorter arms the connection may consist of a casting, or U-shaped member 28 having arms engaging the pin 23 and also carrying a vertical pin 29 on which the tongue is pivoted. The rear portion of each tongue is supported on a frame 30 which is carried on transport means such as wheels 31 of the type designed to ride in and engage the sides of the furrow. The frame 30, at a point behind the supporting wheels 31, carries tillage tools such as disks 32, which are provided with the usual means for adjusting for either inward or outward throw. With each unit supported on transport means near its rear end and pivotally connected at its front end to the draft member 17 on a horizontal axis it will be evident that vertical movement of the member 17 will result in rocking movement of the tillage units with consequent movement of the tillage tools to and from the soil. The vertical pivotal connection of each tongue 21 to its clevis permits each unit to accommodate itself to the furrow.

With the construction above described it is possible to efficiently employ multiple tillage units for cultivating or otherwise working on row crops and particularly for lister planting and cultivating and, through the construction and organization described it is possible to readily control the operation of all of the units simultaneously by raising and lowering the draft member 17.

While there has been described only the preferred embodiment of the invention, it is to be understood that it is the inventors' intention to cover all such modifications and changes in the same as may come within the spirit and scope of the appended claims.

What we claim is:

1. The combination comprising a traction frame, a draft member extending transversely of the frame, tillage units each having a tongue pivotally connected to the draft member and having transport means supporting the rear portion of the tongue, and means connecting the draft member to the traction frame for limited lateral sliding movement thereon including means for vertically adjusting the draft member thereby rocking the tillage units on the transport means.

2. The combination comprising a traction frame, a draft member extending transversely of the frame, draft links pivotally connecting the draft member with the traction frame for horizontal movement, additional means connecting the draft member to the frame for vertical movement, tillage units each with a tongue pivotally connected to the draft member and having transport means supporting the rear portion of the tongue, and means on the traction frame for adjusting the draft member vertically thereby rocking the tillage units on the transport means.

3. The combination comprising a traction frame, a hitch member pivoted thereto for vertical movement, a draft member extending transversely of the frame, draft links pivotally connecting the draft member to the hitch member for horizontal movement, means causing the draft member to move vertically with the hitch member, tillage units each with a tongue pivotally connected to the draft member and having transport means supporting the rear portion of the tongue, and means on the traction frame for adjusting the hitch member vertically thereby rocking the tillage units on the transport means.

4. The combination comprising a traction frame, a hitch member pivoted to the traction frame for vertical movement, a transversely extending draft member carried by the hitch member and connected thereto for limited sliding movement thereon, tillage units each with a tongue pivotally connected to the draft member and having transport means supporting the rear portion of the tongue, and means on the traction frame for adjusting the hitch member about its pivot thereby swinging said draft member vertically and rocking the tillage units on the transport means.

5. The combination comprising a traction frame, a hitch member pivoted to the traction frame for vertical movement, a transversely extending draft member, draft links connecting the hitch member and draft member, means on the hitch for engaging the draft links to restrain them against vertical movement relatively to said hitch and draft members, tillage units each with a tongue pivotally connected to the draft member and having transport means supporting the rear portion of the tongue, and means on the traction frame for adjusting the hitch member about its pivot thereby swinging said draft member vertically and rocking the tillage units on the transport means.

6. The combination comprising a traction frame, a transversely extending draft member, draft connections by which said draft member is pivoted on the traction frame for vertical adjustment, furrow guided tillage units each with a tongue pivoted on horizontal and vertical axes to the draft member and having furrow wheels supporting the rear portion of the tongue, tillage tools on each unit located to the rear of the furrow wheels, and means for swinging the draft member vertically to tilt the tongues about the axes of said wheels to raise and lower said tools.

7. The combination comprising a traction frame, an arched draw bar with its arms hinged to said frame for vertical swinging movement, a hitch bar connecting the forward portions of said arms, draft links having forward ends vertically pivoted on the hitch bar and extending rearwardly beyond the arch of the draw bar, means connecting the draw bar and draft links for relative horizontal movement, a draft member carried by the rear ends of said draft links, means for swinging the draw bar and said connections thereto vertically, and tillage units each with a tongue connected to the draft member.

8. An implement attachment for tractors comprising a bail-shaped hitch bar the arms of which are adapted for connection to a tractor, a draft member extending at right angles to the arms in substantially the same horizontal plane therewith and supported on the hitch bar by means for allowing limited lateral movement of the draft member, and lister cultivator units connected to the draft member in spaced relation by means permitting independent lateral movement of each unit.

9. An implement attachment for tractors comprising a bail-shaped hitch bar the arms of which are adapted for connection to a tractor, a draft member extending at right angles to the arms in substantially the same horizontal plane therewith, a draft connection between the member and hitch bar comprising linkage extending from the draft member and pivotally connected to the hitch bar on a line between the ends of the hitch bar arms and slidably engaging the bight portion of the hitch bar, and lister cultivator units connected to the draft member in spaced relation by means permitting independent lateral movement of each unit.

In testimony whereof we affix our signature.

WILLIAM S. GRAHAM.
ARTHUR D. GALLAGHER.